US008371741B2

(12) United States Patent
Hassan et al.

(10) Patent No.: US 8,371,741 B2
(45) Date of Patent: Feb. 12, 2013

(54) SYSTEM AND PROCESS FOR HYDRODESULFURIZATION, HYDRODENITROGENATION, OR HYDROFINISHING

(75) Inventors: Abbas Hassan, Sugar Land, TX (US); Ebrahim Bagherzadeh, Sugar Land, TX (US); Rayford G. Anthony, College Station, TX (US); Gregory Borsinger, Chatham, NJ (US); Aziz Hassan, Sugar Land, TX (US)

(73) Assignee: H R D Corporation, Houston, TX (US)

( * ) Notice: Subject to any disclaimer, the term of this patent is extended or adjusted under 35 U.S.C. 154(b) by 0 days.

(21) Appl. No.: 13/206,322

(22) Filed: Aug. 9, 2011

(65) Prior Publication Data

US 2011/0293486 A1 Dec. 1, 2011

Related U.S. Application Data

(62) Division of application No. 12/138,224, filed on Jun. 12, 2008, now Pat. No. 8,021,539.

(60) Provisional application No. 60/946,448, filed on Jun. 27, 2007, provisional application No. 60/946,455, filed on Jun. 27, 2007.

(51) Int. Cl.
*B01J 19/00* (2006.01)

(52) U.S. Cl. ........ 366/101; 366/102; 366/103; 366/104; 366/105; 366/241; 366/293; 366/294; 366/295; 366/316; 208/208 R; 208/209; 208/211; 208/212; 208/217; 208/254 R; 208/254 H

(58) Field of Classification Search .......... 366/101–105, 366/241, 293–295, 316; 208/208 R, 209, 208/211, 212, 216 R, 217, 254 R, 254 H
See application file for complete search history.

(56) References Cited

U.S. PATENT DOCUMENTS

| | | | |
|---|---|---|---|
| 2,520,424 | A | 8/1950 | Mills et. al. |
| 3,147,206 | A | 9/1964 | Tullners |
| 3,523,887 | A | 8/1970 | Hanson et. al. |
| 3,884,798 | A | 5/1975 | Hilfman |
| 3,887,167 | A | 6/1975 | Irwin |
| 3,996,012 | A | 12/1976 | Zucker |
| 4,108,682 | A | 8/1978 | Takeda et al. |

(Continued)

FOREIGN PATENT DOCUMENTS

| | | |
|---|---|---|
| EP | 0964745 B1 | 9/2001 |
| GB | 887794 | 1/1962 |

(Continued)

OTHER PUBLICATIONS

European International Search Report dated Aug. 5, 2011 for International Application No. EP08771783.1 (12 pp.).

(Continued)

*Primary Examiner* — Walter D Griffin
*Assistant Examiner* — Brian McCaig
(74) *Attorney, Agent, or Firm* — Porter Hedges LLP; Timothy S. Westby

(57) ABSTRACT

A method for hydrodesulfurization by forming a dispersion comprising hydrogen-containing gas bubbles with a mean diameter of less than 1 micron dispersed in a liquid phase comprising sulfur-containing compounds. Desulfurizing a liquid stream comprising sulfur-containing compounds by subjecting a fluid mixture comprising hydrogen-containing gas and the liquid to a shear rate greater than 20,000 $s^{-1}$ to produce a dispersion of hydrogen in a continuous phase of the liquid and introducing the dispersion into a fixed bed hydrodesulfurization reactor from which a reactor product is removed. Systems of apparatus for hydrodesulfurization are also presented.

17 Claims, 4 Drawing Sheets

U.S. PATENT DOCUMENTS

| | | | |
|---|---|---|---|
| 4,434,049 A | 2/1984 | Dean et al. | |
| 4,861,459 A | 8/1989 | Cetinkaya | |
| 4,973,430 A | 11/1990 | Rivers, Jr. | |
| 5,133,941 A | 7/1992 | Hays et al. | |
| 5,391,287 A | 2/1995 | Nakagawa | |
| 5,538,191 A | 7/1996 | Holl | |
| 5,877,350 A | 3/1999 | Langer et al. | |
| 6,251,263 B1 | 6/2001 | Hatanaka et al. | |
| 6,368,366 B1 | 4/2002 | Langer et al. | |
| 6,368,367 B1 | 4/2002 | Langer et al. | |
| 6,383,237 B1 | 5/2002 | Langer et al. | |
| 6,413,413 B1 | 7/2002 | Smith, Jr. | |
| 6,517,706 B1 * | 2/2003 | Pruden et al. | 208/108 |
| 6,530,964 B2 | 3/2003 | Langer et al. | |
| 6,742,774 B2 | 6/2004 | Holl | |
| 6,881,326 B2 | 4/2005 | Ackerson et al. | |
| 7,008,595 B2 | 3/2006 | Pankaj et al. | |
| 2002/0116868 A1 * | 8/2002 | Westfall et al. | 44/301 |
| 2003/0043690 A1 | 3/2003 | Holl | |
| 2003/0084658 A1 | 5/2003 | Brown et al. | |
| 2003/0225306 A1 | 12/2003 | Boelt et al. | |
| 2004/0052158 A1 | 3/2004 | Holl | |
| 2005/0033069 A1 | 2/2005 | Holl et al. | |
| 2005/0234281 A1 | 10/2005 | Bjorklund et al. | |
| 2005/0241992 A1 | 11/2005 | Lott et al. | |
| 2006/0054534 A1 * | 3/2006 | Chen et al. | 208/111.3 |
| 2006/0102519 A1 | 5/2006 | Tonkovich et al. | |
| 2006/0116544 A1 | 6/2006 | Wakui et al. | |
| 2006/0254956 A1 | 11/2006 | Khan | |
| 2007/0030322 A1 | 2/2007 | Lee et al. | |
| 2007/0138061 A1 | 6/2007 | Costinel | |

FOREIGN PATENT DOCUMENTS

| | | |
|---|---|---|
| JP | 11-092772 A | 4/1999 |
| JP | 11092772 A | 4/1999 |
| MY | 143175 | 3/2011 |
| NG | 2009357 | 12/2009 |
| SG | 154128 | 6/2012 |
| WO | 0018854 | 4/2000 |
| WO | 02/064708 | 8/2002 |
| WO | 2006122275 | 11/2006 |
| ZA | 200904649 | 9/2010 |

OTHER PUBLICATIONS

Gary, J.H. et al. (2007). Petroleum Refining Technology and Economics, 5th ed., Taylor & Francis, 465 pgs.

Speight, J.G. (1999). The Chemistry and Technology of Petroleum, Marcer-Kekker, 918 pgs.

Fahim, M.A. et al. (199). Ind. Eng. Chem. Res., 30, 255-259.

Eurasian Office Action received Feb. 17, 2012 for corresponding Eurasian Patent Application No. 200901635 (2 pgs).

Gogate et. al., "Caviation: A technology on the Horizon," Current Science 91 (No. 1): 35-46 (2006).

Chinese Office Action dated Jul. 13, 2011 for corresponding Chinese Application No. 200880003123.3, 6 pages.

Korean Office Action dated Mar. 14, 2011 for corresponding Korean Patent Application No. 10-2009-7017030, English Translation (4 pages).

European Search Report dated Apr. 21, 2011 for corresponding European Application No. 08771785.6 (5 pages).

Korean Final Office Action Summary dated Dec. 30, 2011 for corresponding Korean Patent Application No. 10-2009-7017030 (1 page).

U.S. Office Action dated Oct. 26, 2011 for corresponding U.S. Appl. No. 12/138,234 (24 pgs).

Canadian Office Action dated Feb. 2, 2012 for corresponding Canadian Patent Application No. 2,675,825 (2 pgs.).

Office Action dated Feb. 24, 2011 for U.S. Appl. No. 12/796,358 (13 pgs.).

Office Action dated Feb. 29, 2012 for U.S. Appl. No. 12/146,733 (8 pgs.).

Office Action dated Jun. 3, 2011 for U.S. Appl. No. 12/568,155 (11 pgs.).

Office Action dated Jun. 2, 2011 for U.S. Appl. No. 12/427,286 (12 pgs.).

Office Action dated Jun. 3, 2011 for U.S. Appl. No. 12/568,280 (16 pgs.).

International Search Report and Written Opinion dated Oct. 28, 2008 for corresponding International Application No. PCT/US2008/067974 (7 pgs.).

Eurasian Notice of Grant dated Jun. 26, 2012 for corresponding Eurasian Application No. 200901635/13 (9 pgs.).

Chinese Notice of Grant dated Feb. 1, 2012 for corresponding Chinese Application No. 200880003123.3 (4 pgs.).

Malaysia Notice of Grant dated Jun. 24, 2011 for corresponding Malaysia Application No. PI 20092857 (4 pgs.).

Canadian Office Action dated Aug. 23, 2010 for corresponding Canadian Application No. 2,675,825 (3 pgs.).

Japanese Office Action dated Sep. 18, 2012 for corresponding Japanese Application No. 2009-552941(5 pgs.).

Mexican Office Action dated Nov. 9, 2011 for corresponding Mexican Application No. MX/a/2009/007601 (2 pgs.).

Korean Office Action dated Oct. 12, 2012 for corresponding Korean Application No. 10-2012-7005453 (7 pgs.).

US Office Action dated Mar. 13, 2012 for corresponding U.S. Appl. No. 12/138,234, 14 pages.

EPO Examination Report dated May 25, 2012 for corresponding EP Application No. 08771783.1, 5 pages.

Office Action dated Jun. 25, 2009 for U.S. Appl. No. 12/142,447.

Office Action dated Jan. 7, 2010 for U.S. Appl. No. 12/142,447.

Office Action dated May 13, 2010 for U.S. Appl. No. 12/142,447.

Office Action dated Feb. 4, 2010 for U.S. Appl. No. 12/492,721.

Office Action dated Feb. 18, 2010 for U.S. Appl. No. 12/635,433.

Office Action dated Feb. 18, 2010 for U.S. Appl. No. 12/635,454.

Office Action dated May 14, 2010 for U.S. Appl. No. 12/137,441.

Office Action dated Feb. 19, 2010 for U.S. Appl. No. 12/144,459.

Office Action dated Sep. 2, 2009 for U.S. Appl. No. 12/142,433.

Office Action dated Jan. 29, 2010 for U.S. Appl. No. 12/142,433.

Office Action dated May 24, 2010 for U.S. Appl. No. 12/142,433.

Office Action dated Apr. 30, 2010 for U.S. Appl. No. 12/141,191.

Office Action dated Oct. 27, 2009 for U.S. Appl. No. 12/142,120.

Office Action dated May 5, 2010 for U.S. Appl. No. 12/571,537.

Office Action dated May 16, 2012 in corresponding Chinese Application No. 200880008717.3, (English Translation, 3 pgs.).

IKA Rotor-Stator Generators—2003 Processing Catalog (38 pgs.).

* cited by examiner

SYSTEM AND PROCESS FOR HYDRODESULFURIZATION, HYDRODENITROGENATION, OR HYDROFINISHING

CROSS-REFERENCE TO RELATED APPLICATIONS

This application is a divisional application of U.S. patent application Ser. No. 12/138,224, filed Jun. 12, 2008, and issued as U.S. Pat. No. 8,021,539, which claims the benefit under 35 U.S.C. §119(e) of U.S. Provisional Patent Application No. 60/946,448, entitled "High Shear Hydrodesulfurization Process," filed Jun. 27, 2007, and U.S. Provisional Patent Application No. 60/946,455, entitled "High Shear Hydrofinishing Process," filed Jun. 27, 2007. The disclosures of said applications are hereby incorporated herein by reference.

STATEMENT REGARDING FEDERALLY SPONSORED RESEARCH OR DEVELOPMENT

Not Applicable.

BACKGROUND OF THE INVENTION

1. Technical Field

The present invention relates generally to hydrodesulfurization, hydrodenitrogenation, and/or saturation of double bonds in liquid streams. More particularly, the present invention relates to a high shear system and process for improving hydrodesulfurization, hydrodenitrogenation, and/or saturation of double bonds of liquid streams.

2. Background of the Invention

Hydrotreating refers to a variety of catalytic hydrogenation processes. Among the known hydroprocesses are hydrodesulfurization, hydrodenitrogenation and hydrodemetallation wherein feedstocks such as residuum-containing oils are contacted with catalysts under conditions of elevated temperature and pressure and in the presence of hydrogen so that the sulfur components are converted to hydrogen sulfide, the nitrogen components to ammonia, and the metals are deposited (usually as sulfides) on the catalyst.

Recent regulatory requirements regarding levels of sulfur in fuels, diesel and gasoline, have created a greater need for more efficient means of sulfur removal. The feedstocks that are subjected to hydrotreating range from naphtha to vacuum resid, and the products in most applications are used as environmentally acceptable clean fuels.

Characteristic for hydrotreatment operations is that there is essentially no change in molecular size distribution, in contrast to, for instance, hydrocracking. Hydrodesulfurization (HDS) is a sub category of hydrotreating where a catalytic chemical process is used to remove sulfur from natural gas and from refined petroleum products such as gasoline or petrol, jet fuel, kerosene, diesel fuel, and fuel oils. The purpose of removing the sulfur is to reduce the sulfur oxide emissions that result from the use of the fuels in powering transportation vehicles or burning as fuel. In the petroleum refining industry, the HDS unit is also often referred to as a hydrotreater. In conventional hydrodesulfurization, carbonaceous fluids and hydrogen are treated at high temperature and pressure in the presence of catalysts. Sulfur is reduced to $H_2S$ gas which may then be oxidized to elemental sulfur via, for example, the Claus process.

While hydrodesulfurization (HDS) is assuming an increasingly important role in view of the tightening sulfur specifications, hydrodenitrogenation (HDN) is another process that hydrocarbon streams may also undergo in order to allow for efficient subsequent upgrading processes. Hydrofinishing or polishing hydrocarbon streams by, for example, saturating double bonds is also an important upgrading process, especially for naphthenic streams.

In addition to its removal for pollution prevention, sulfur is also removed in situations where a downstream processing catalyst can be poisoned by the presence of sulfur. For example, sulfur may be removed from naphtha streams when noble metal catalysts (e.g., platinum and/or rhenium) are used in catalytic reforming units that are used to enhance the octane rating of the naphtha streams.

Many of the previous methods and systems for removing sulfur-containing compounds from carbonaceous fluids may be costly, include harsh reaction conditions, may be inadequate for the removal of substantial amounts of sulfur-containing compounds, may be ineffective for the removal of sulfur-containing compounds having certain chemical structures, and/or may not be easily scaled-up to large fluid volumes.

Accordingly, there is a need in the industry for improved processes for hydrodesulfurizing, hydrodenitrogenating, and hydrofinishing carbonaceous fluid streams.

SUMMARY

High shear systems and methods for improving hydrodesulfurization, hydrodenitrogenation, and hydrofinishing are disclosed. In accordance with certain embodiments, a method of hydrodesulfurization, hydrodenitrogenation, hydrofinishing, or a combination thereof is presented which comprises forming a dispersion comprising hydrogen-containing gas bubbles dispersed in a liquid phase comprising hydrocarbons, wherein the bubbles have a mean diameter of less than 1.5 μm. In embodiments, at least a portion of sulfur-containing compounds in the liquid phase are reduced to form hydrogen sulfide gas. In embodiments, at least a portion of nitrogen-containing compounds in the liquid phase are converted to ammonia. In embodiments, at least a portion of unsaturated carbon-carbon double bonds in the hydrocarbon are saturated by hydrogenation. The high shear mixing potentially provides enhanced time, temperature and pressure conditions resulting in accelerated chemical reactions between multiphase reactants. The gas bubbles may have a mean diameter of less than 1 μm. In embodiments, the gas bubbles have a mean diameter of no more than 400 nm.

The liquid phase may comprise hydrocarbons selected from the group consisting of liquid natural gas, crude oil, crude oil fractions, gasoline, diesel, naphtha, kerosene, jet fuel, fuel oils and combinations thereof. Forming the dispersion may comprise subjecting a mixture of the hydrogen-containing gas and the liquid phase to a shear rate of greater than about 20,000 $s^{-1}$. Forming the dispersion may comprise contacting the hydrogen-containing gas and the liquid phase in a high shear device, wherein the high shear device comprises at least one rotor, and wherein the at least one rotor is rotated at a tip speed of at least 22.9 m/s (4,500 ft/min) during formation of the dispersion. The high shear device may produce a local pressure of at least about 1034.2 MPa (150,000 psi) at the tip of the at least one rotor. In embodiments, the energy expenditure of the high shear device is greater than 1000 $W/m^3$.

The method may further comprise contacting the dispersion with a catalyst that is active for hydrodesulfurization, hydrodenitrogenation, hydrofinishing, or a combination thereof. The catalyst may comprise a metal selected from the group consisting of cobalt molybdenum, ruthenium, and combinations thereof.

Also disclosed is a method for hydrodesulfurization, hydrodenitrogenation, or hydrofinishing comprising subjecting a fluid mixture comprising hydrogen-containing gas and a liquid comprising sulfur-containing components, nitrogen-containing components, unsaturated bonds, or a combination thereof to a shear rate greater than 20,000 $s^{-1}$ in an external high shear device to produce a dispersion of hydrogen in a continuous phase of the liquid, and introducing the dispersion into a fixed bed from which a reactor product is removed, wherein the fixed bed reactor comprises catalyst effective for hydrodesulfurization, hydrodenitrogenation, hydrofinishing, or a combination thereof. The method may further comprise separating the reactor product into a gas stream and a liquid product stream comprising desulfurized hydrocarbon liquid product; stripping hydrogen sulfide from the gas stream, producing a hydrogen sulfide lean gas stream; and recycling at least a portion of the hydrogen sulfide lean gas stream to the external high shear device. The method may further comprise reforming the desulfurized hydrocarbon liquid product. Hydrogen may be recovered from the reforming and at least a portion of recovered hydrogen may be recycled. The average bubble diameter of the hydrogen gas bubbles in the dispersion may be less than about 5 μm. The dispersion may be stable for at least about 15 minutes at atmospheric pressure. Exerting shear on the fluid may comprise introducing the fluid into a high shear device comprising at least two generators.

Also disclosed is a system for hydrodesulfurization, hydrodenitrogenation, or hydrofinishing comprising at least one high shear mixing device comprising at least one rotor and at least one stator separated by a shear gap in the range of from about 0.02 mm to about 5 mm, wherein the shear gap is the minimum distance between the at least one rotor and the at least stator, and wherein the high shear mixing device is capable of producing a tip speed of the at least one rotor in the range of greater than 22.9 m/s (4,500 ft/min), and a pump configured for delivering a liquid stream comprising liquid phase to the high shear mixing device. The system may further comprise a vessel configured for receiving the dispersion from the high shear device and for maintaining a predetermined pressure and temperature.

The at least one high shear mixing device may be configured for producing a dispersion of hydrogen-containing gas bubbles in a liquid phase selected from liquid phases comprising sulfur-containing species and hydrocarbons; liquid phases comprising nitrogen-containing species and hydrocarbons; and liquid phases comprising unsaturated hydrocarbons; wherein the dispersion has a mean bubble diameter of less than 400 nm. In embodiments, the at least one high shear mixing device is capable of producing a tip speed of the at least one rotor of at least 40.1 m/s (7,900 ft/min). In some embodiments, the system comprises at least two high shear mixing devices.

Also disclosed herein is a system for hydrodesulfurization, hydrodenitrogenation, or hydrofinishing comprising a reactor selected from hydrodesulfurization, hydrodenitrogenation, and hydrofinishing reactors, wherein the reactor comprises a fixed catalyst bed; and a high shear device comprising an inlet for a fluid stream comprising a liquid and hydrogen gas, and an outlet for a product dispersion, wherein the outlet of the high shear device is fluidly connected to an inlet of the reactor, and wherein the high shear device is capable of producing a dispersion of hydrogen bubbles having a bubble diameter of less than about 5 μm in the liquid. The high shear device may comprise a high shear mill having a tip speed of greater than 5.08 m/s (1000 ft/min). The high shear device may have a tip speed of greater than 20.3 m/s (4000 ft/min).

In a system for hydrodesulfurization, hydrodenitrogenation, or hydrofinishing including a fixed bed reactor, the reactor comprising catalyst effective for hydrodesulfurization, hydrodenitrogenation, hydrofinishing, or a combination thereof, an improvement comprising an external high shear device upstream of the reactor, the external high shear device comprising at least one generator comprising a rotor and a stator having a shear gap therebetween and an inlet for a fluid stream comprising hydrogen gas and a liquid phase selected from liquid phases comprising sulfur-containing species and hydrocarbons; liquid phases comprising nitrogen-containing species and hydrocarbons; and liquid phases comprising unsaturated hydrocarbons; and, wherein the high shear device provides an energy expenditure of greater than 1000 $W/m^3$ of fluid. In embodiments, the high shear device comprises at least two generators. In embodiments, the shear rate provided by one generator is greater than the shear rate provided by another generator.

In some embodiments, the system further comprises a pump configured for delivering a liquid stream comprising hydrocarbons to the high shear mixing device. In some embodiments, the system further comprises a vessel configured for receiving the dispersion from the high shear device. Some embodiments of the system potentially make possible the hydrodesulfurization, hydrodenitrogenation, or hydrofinishing of carbonaceous streams without the need for large volume reactors, via use of an external pressurized high shear reactor.

Certain embodiments of an above-described method or system potentially provide for more optimal time, temperature and pressure conditions than are otherwise possible, and which potentially increase the rate of the multiphase process. Certain embodiments of the above-described methods or systems potentially provide overall cost reduction by operating at lower temperature and/or pressure, providing increased product per unit of catalyst consumed, decreased reaction time, and/or reduced capital and/or operating costs. These and other embodiments and potential advantages will be apparent in the following detailed description and drawings.

BRIEF DESCRIPTION OF THE DRAWINGS

For a more detailed description of the preferred embodiment of the present invention, reference will now be made to the accompanying drawings, wherein.

NOTATION AND NOMENCLATURE

Figure 1:
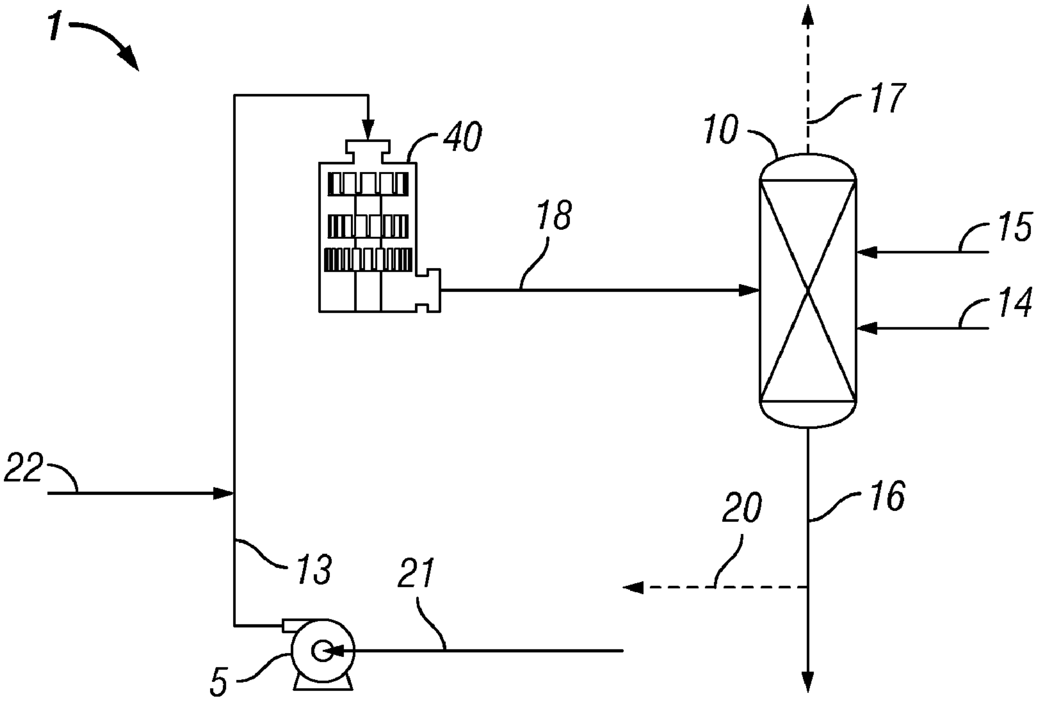
FIG. 1 is a schematic of a multiphase reaction system according to an embodiment of the present disclosure comprising external high shear dispersing.

As used herein, the term "dispersion" refers to a liquefied mixture that contains at least two distinguishable substances (or "phases") that will not readily mix and dissolve together. As used herein, a "dispersion" comprises a "continuous" phase (or "matrix"), which holds therein discontinuous droplets, bubbles, and/or particles of the other phase or substance.

The term dispersion may thus refer to foams comprising gas bubbles suspended in a liquid continuous phase, emulsions in which droplets of a first liquid are dispersed throughout a continuous phase comprising a second liquid with which the first liquid is immiscible, and continuous liquid phases throughout which solid particles are distributed. As used herein, the term "dispersion" encompasses continuous liquid phases throughout which gas bubbles are distributed, continuous liquid phases throughout which solid particles (e.g., solid catalyst) are distributed, continuous phases of a first liquid throughout which droplets of a second liquid that is substantially insoluble in the continuous phase are distributed, and liquid phases throughout which any one or a combination of solid particles, immiscible liquid droplets, and gas bubbles are distributed. Hence, a dispersion can exist as a homogeneous mixture in some cases (e.g., liquid/liquid phase), or as a heterogeneous mixture (e.g., gas/liquid, solid/liquid, or gas/solid/liquid), depending on the nature of the materials selected for combination.

DETAILED DESCRIPTION

Overview

The rate of chemical reactions involving liquids, gases and solids depend on time of contact, temperature, and pressure. In cases where it is desirable to react two or more raw materials of different phases (e.g. solid and liquid; liquid and gas; solid, liquid and gas), one of the limiting factors controlling the rate of reaction involves the contact time of the reactants. In the case of heterogeneously catalyzed reactions there is the additional rate limiting factor of having the reacted products removed from the surface of the catalyst to permit the catalyst to catalyze further reactants. Contact time for the reactants and/or catalyst is often controlled by mixing which provides contact with two or more reactants involved in a chemical reaction.

A reactor assembly that comprises an external high shear device or mixer as described herein makes possible decreased mass transfer limitations and thereby allows the reaction to more closely approach kinetic limitations. When reaction rates are accelerated, residence times may be decreased, thereby increasing obtainable throughput. Product yield may be increased as a result of the high shear system and process. Alternatively, if the product yield of an existing process is acceptable, decreasing the required residence time by incorporation of suitable high shear may allow for the use of lower temperatures and/or pressures than conventional processes.

Furthermore, without wishing to be limited by theory, it is believed that the high shear conditions provided by a reactor assembly that comprises an external high shear device or mixer as described herein may permit hydrodesulfurization at global operating conditions under which reaction may not conventionally be expected to occur to any significant extent. Although the discussion of the system and method will be made with reference to hydrodesulfurization, it is to be understood that the disclosed system and method are also applicable to hydrodenitrogenation and hydrofinishing of hydrocarbon streams.

System for Hydrodesulfurization. A high shear hydrodesulfurization system will now be described in relation to FIG. 1, which is a process flow diagram of an embodiment of a high shear system 1 for hydrodesulfurization of fluid comprising sulfur-containing species. The basic components of a representative system include external high shear mixing device (HSD) 40, vessel 10, and pump 5. As shown in FIG. 1, high shear device 40 is located external to vessel/reactor 10. Each of these components is further described in more detail below.

Line 21 is connected to pump 5 for introducing carbonaceous fluid comprising sulfur-containing compounds. Line 13 connects pump 5 to HSD 40, and line 18 connects HSD 40 to vessel 10. Line 22 may be connected to line 13 for introducing a hydrogen-containing gas (e.g., $H_2$). Alternatively, line 22 may be connected to an inlet of HSD 40. Line 17 may be connected to vessel 10 for removal of unreacted hydrogen, hydrogen sulfide product and/or other reaction gases. Additional components or process steps may be incorporated between vessel 10 and HSD 40, or ahead of pump 5 or HSD 40, if desired, as will become apparent upon reading the description of the high shear hydrodesulfurization process described hereinbelow. For example, line 20 may be connected to line 21 or line 13 from a downstream location (e.g., from vessel 10), to provide for multi-pass operation, if desired.

Figure 2:
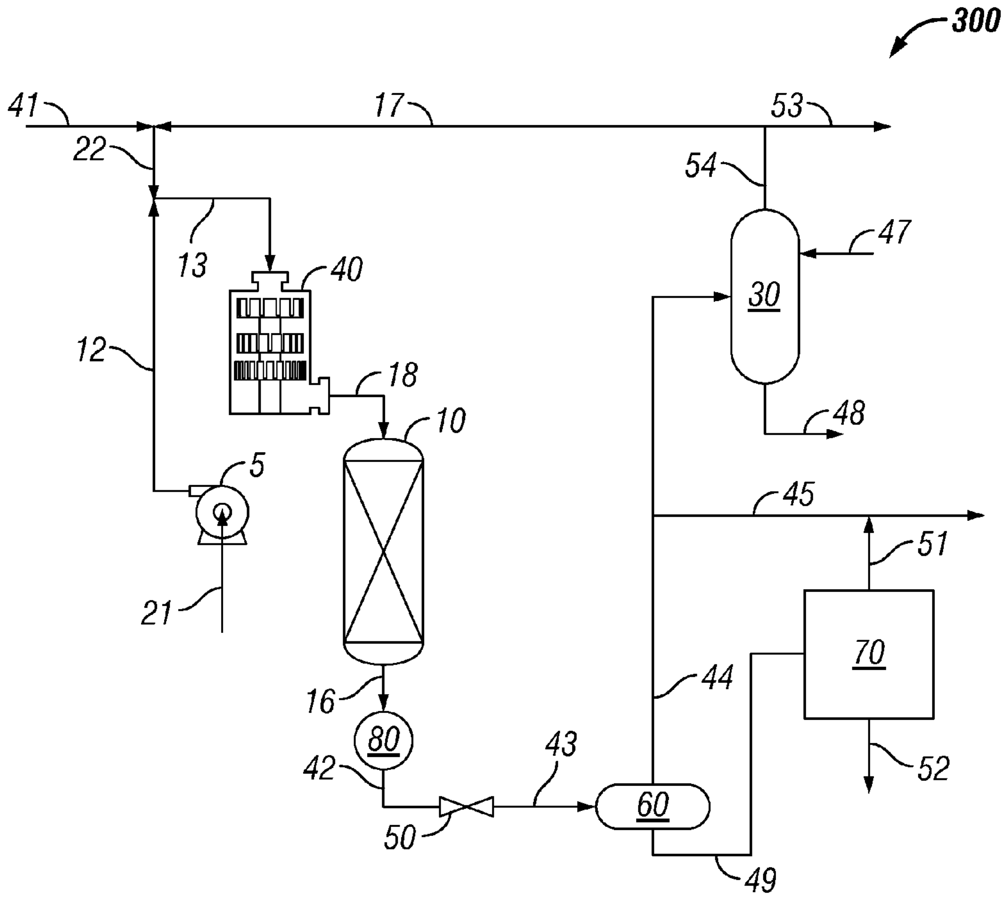
FIG. 2 is a schematic of a multiphase reaction system according to another embodiment of the present disclosure comprising external high shear dispersing.

A high shear hydrodesulfurization system may further comprise downstream processing units by which hydrogen sulfide gas is removed from the product in vessel 10. FIG. 2 is a schematic of a high shear hydrodesulfurization system 300 according to another embodiment of the present disclosure comprising external high shear dispersing device 40. In the embodiment of FIG. 2, high shear hydrodesulfurization system 300 further comprises gas separator vessel 60, hydrogen sulfide absorber 30 and reboiled stripper distillation tower 70.

In embodiments, the high shear desulfurization system further comprises a gas separator vessel downstream of vessel 10. Gas separator vessel 60 may comprise an inlet for at least a portion of the product from vessel 10 which comprises hydrogen sulfide and carbonaceous liquid, an outlet line 44 for a gas stream comprising hydrogen sulfide and a gas separator liquid outlet line 49 for a liquid from which sulfur-containing compounds have been removed.

High shear hydrodesulfurization system 300 may further comprise an absorber 30. Absorber 30 may comprise an inlet for at least a portion of the gas stream exiting gas separator 60 via outlet line 44, an inlet 47 for a lean amine stream, an outlet 48 for a rich amine stream, and an outlet line 54 for a cleaned gas from which hydrogen sulfide has been removed. Line 45 may be fluidly connected to gas separator gas outlet line 44 and may be used to direct a portion of the hydrogen-sulfide containing gas in gas separator outlet line 44 for further processing. Line 53 may direct a portion of cleaned gas in absorber gas outlet line 54 for further processing. Line 17 may direct a portion of cleaned gas in absorber outlet line 54 back to high shear device 40. For example, line 17 may be fluidly connected with line 41 containing fresh hydrogen-containing gas whereby dispersible hydrogen-containing gas line 22 is fed.

High shear system 300 may also comprise a distillation tower 70. Distillation tower 70 may be a reboiled stripper distillation tower, for example. Distillation unit 70 comprises an inlet in fluid communication with gas separator liquid outlet line 49 from gas separator 60, an outlet 51 for a low-boiling product stream, and an outlet 52 for liquid product which comprises carbonaceous liquid from which sulfur-containing compounds have been removed. Outlet 51 may be fluidly connected to line 45.

High shear hydrodesulfurization system 300 may further comprise heat exchanger 80 which may be positioned on outlet line 16 of vessel 10 and may serve to partially cool hot reaction products exiting vessel 10. Heat exchanger 80 may also be used, in some applications, to preheat reactor feed in line 21. Heat exchanger 80 may be water-cooled, for instance. In embodiments, heat-exchanged reactor product in outlet line 42 undergoes a pressure reduction. Pressure reduction may be effected via pressure controller 50. In embodiments, outlet line 42 fluidly connects heat exchanger 80 and pressure controller 50. PC 50 may reduce the pressure of the fluid in outlet line 42 to about 303.9 kPa-506.6 kPa (3 to 5 atmospheres). Outlet line 43 from pressure controller 50 fluidly connect gas separator 60 and pressure controller 50. The mixture of liquid and gas exiting pressure controller 50 via outlet line 43 may enter gas separator vessel 60 at, for example, about 35° C. and 303.9 kPa-506.6 kPa (3 to 5 atmospheres) of absolute pressure.

High Shear Mixing Device. External high shear mixing device (HSD) 40, also sometimes referred to as a high shear device or high shear mixing device, is configured for receiving an inlet stream, via line 13, comprising carbonaceous fluid comprising sulfur-containing compounds and molecular hydrogen. Alternatively, HSD 40 may be configured for receiving the liquid and gaseous reactant streams via separate inlet lines (not shown). Although only one high shear device is shown in FIG. 1, it should be understood that some embodiments of the system may have two or more high shear mixing devices arranged either in series or parallel flow. HSD 40 is a mechanical device that utilizes one or more generator comprising a rotor/stator combination, each of which has a gap between the stator and rotor. The gap between the rotor and the stator in each generator set may be fixed or may be adjustable. HSD 40 is configured in such a way that it is capable of producing submicron and micron-sized bubbles in a reactant mixture flowing through the high shear device. The high shear device comprises an enclosure or housing so that the pressure and temperature of the reaction mixture may be controlled.

High shear mixing devices are generally divided into three general classes, based upon their ability to mix fluids. Mixing is the process of reducing the size of particles or inhomogeneous species within the fluid. One metric for the degree or thoroughness of mixing is the energy density per unit volume that the mixing device generates to disrupt the fluid particles. The classes are distinguished based on delivered energy densities. Three classes of industrial mixers having sufficient energy density to consistently produce mixtures or emulsions with particle sizes in the range of submicron to 50 microns include homogenization valve systems, colloid mills and high speed mixers. In the first class of high energy devices, referred to as homogenization valve systems, fluid to be processed is pumped under very high pressure through a narrow-gap valve into a lower pressure environment. The pressure gradients across the valve and the resulting turbulence and cavitation act to break-up any particles in the fluid. These valve systems are most commonly used in milk homogenization and can yield average particle sizes in the submicron to about 1 micron range.

At the opposite end of the energy density spectrum is the third class of devices referred to as low energy devices. These systems usually have paddles or fluid rotors that turn at high speed in a reservoir of fluid to be processed, which in many of the more common applications is a food product. These low energy systems are customarily used when average particle sizes of greater than 20 microns are acceptable in the processed fluid.

Between the low energy devices and homogenization valve systems, in terms of the mixing energy density delivered to the fluid, are colloid mills and other high speed rotor-stator devices, which are classified as intermediate energy devices. A typical colloid mill configuration includes a conical or disk rotor that is separated from a complementary, liquid-cooled stator by a closely-controlled rotor-stator gap, which is commonly between 0.0254 mm to 10.16 mm (0.001-0.40 inch). Rotors are usually driven by an electric motor through a direct drive or belt mechanism. As the rotor rotates at high rates, it pumps fluid between the outer surface of the rotor and the inner surface of the stator, and shear forces generated in the gap process the fluid. Many colloid mills with proper adjustment achieve average particle sizes of 0.1-25 microns in the processed fluid. These capabilities render colloid mills appropriate for a variety of applications including colloid and oil/water-based emulsion processing such as that required for cosmetics, mayonnaise, or silicone/silver amalgam formation, to roofing-tar mixing.

Tip speed is the circumferential distance traveled by the tip of the rotor per unit of time. Tip speed is thus a function of the rotor diameter and the rotational frequency. Tip speed (in meters per minute, for example) may be calculated by multiplying the circumferential distance transcribed by the rotor tip, $2\pi R$, where R is the radius of the rotor (meters, for example) times the frequency of revolution (for example revolutions per minute, rpm). A colloid mill, for example, may have a tip speed in excess of 22.9 m/s (4500 ft/min) and may exceed 40 m/s (7900 ft/min). For the purpose of this disclosure, the term 'high shear' refers to mechanical rotor stator devices (e.g., colloid mills or rotor-stator dispersers) that are capable of tip speeds in excess of 5.1 m/s. (1000 ft/min) and require an external mechanically driven power device to drive energy into the stream of products to be reacted. For example, in HSD 40, a tip speed in excess of 22.9 m/s (4500 ft/min) is achievable, and may exceed 40 m/s (7900 ft/min). In some embodiments, HSD 40 is capable of delivering at least 300 L/h at a tip speed of at least 22.9 m/s (4500 ft/min). The power consumption may be about 1.5 kW. HSD 40 combines high tip speed with a very small shear gap to produce significant shear on the material being processed. The amount of shear will be dependent on the viscosity of the fluid. Accordingly, a local region of elevated pressure and temperature is created at the tip of the rotor during operation of the high shear device. In some cases the locally elevated pressure is about 1034.2 MPa (150,000 psi). In some cases the locally elevated temperature is about 500° C. In some cases, these local pressure and temperature elevations may persist for nano or pico seconds.

An approximation of energy input into the fluid (kW/L/min) can be estimated by measuring the motor energy (kW) and fluid output (L/min). As mentioned above, tip speed is the velocity (ft/min or m/s) associated with the end of the one or more revolving elements that is creating the mechanical force applied to the reactants. In embodiments, the energy expenditure of HSD 40 is greater than 1000 $W/m^3$. In embodiments, the energy expenditure of HSD 40 is in the range of from about 3000 $W/m^3$ to about 7500 $W/m^3$.

The shear rate is the tip speed divided by the shear gap width (minimal clearance between the rotor and stator). The shear rate generated in HSD 40 may be in the greater than 20,000 $s^{-1}$. In some embodiments the shear rate is at least 40,000 $s^{-1}$. In some embodiments the shear rate is at least 100,000 $s^{-1}$. In some embodiments the shear rate is at least 500,000 $s^{-1}$. In some embodiments the shear rate is at least 1,000,000 $s^{-1}$. In some embodiments the shear rate is at least 1,600,000 $s^{-1}$. In embodiments, the shear rate generated by HSD 40 is in the range of from 20,000 $s^{-1}$ to 100,000 $s^{-1}$. For example, in one application the rotor tip speed is about 40 m/s (7900 ft/min) and the shear gap width is 0.0254 mm (0.001 inch), producing a shear rate of 1,600,000 $s^{-1}$. In another application the rotor tip speed is about 22.9 m/s (4500 ft/min) and the shear gap width is 0.0254 mm (0.001 inch), producing a shear rate of about 901,600 $s^{-1}$.

HSD 40 is capable of highly dispersing or transporting hydrogen into a main liquid phase (continuous phase) comprising carbonaceous fluid, with which it would normally be immiscible, at conditions such that at least a portion of the hydrogen reacts with the sulfur-containing compounds in the carbonaceous fluid to produce a product stream comprising hydrogen sulfide. In embodiments, the carbonaceous fluid further comprises a catalyst. In some embodiments, HSD 40 comprises a colloid mill. Suitable colloidal mills are manufactured by IKA® Works, Inc. Wilmington, N.C. and APV North America, Inc. Wilmington, Mass., for example. In some instances, HSD 40 comprises the Dispax Reactor® of IKA® Works, Inc.

The high shear device comprises at least one revolving element that creates the mechanical force applied to the reactants. The high shear device comprises at least one stator and at least one rotor separated by a clearance. For example, the rotors may be conical or disk shaped and may be separated from a complementarily-shaped stator. In embodiments, both the rotor and stator comprise a plurality of circumferentially-spaced teeth. In some embodiments, the stator(s) are adjustable to obtain the desired shear gap between the rotor and the stator of each generator (rotor/stator set). Grooves between the teeth of the rotor and/or stator may alternate direction in alternate stages for increased turbulence. Each generator may be driven by any suitable drive system configured for providing the necessary rotation.

In some embodiments, the minimum clearance (shear gap width) between the stator and the rotor is in the range of from about 0.0254 mm (0.001 inch) to about 3.175 mm (0.125 inch). In certain embodiments, the minimum clearance (shear gap width) between the stator and rotor is about 1.52 mm (0.060 inch). In certain configurations, the minimum clearance (shear gap) between the rotor and stator is at least 1.78 mm (0.07 inch). The shear rate produced by the high shear device may vary with longitudinal position along the flow pathway. In some embodiments, the rotor is set to rotate at a speed commensurate with the diameter of the rotor and the desired tip speed. In some embodiments, the high shear device has a fixed clearance (shear gap width) between the stator and rotor. Alternatively, the high shear device has adjustable clearance (shear gap width).

In some embodiments, HSD 40 comprises a single stage dispersing chamber (i.e., a single rotor/stator combination, a single generator). In some embodiments, high shear device 40 is a multiple stage inline disperser and comprises a plurality of generators. In certain embodiments, HSD 40 comprises at least two generators. In other embodiments, high shear device 40 comprises at least 3 high shear generators. In some embodiments, high shear device 40 is a multistage mixer whereby the shear rate (which, as mentioned above, varies proportionately with tip speed and inversely with rotor/stator gap width) varies with longitudinal position along the flow pathway, as further described herein below.

In some embodiments, each stage of the external high shear device has interchangeable mixing tools, offering flexibility. For example, the DR 2000/4 Dispax Reactor® of IKA® Works, Inc. Wilmington, N.C. and APV North America, Inc. Wilmington, Mass., comprises a three stage dispersing module. This module may comprise up to three rotor/stator combinations (generators), with choice of fine, medium, coarse, and super-fine for each stage. This allows for creation of dispersions having a narrow distribution of the desired bubble size (e.g., hydrogen gas bubbles). In some embodiments, each of the stages is operated with super-fine generator. In some embodiments, at least one of the generator sets has a rotor/stator minimum clearance (shear gap width) of greater than about 5.08 mm (0.20 inch). In alternative embodiments, at least one of the generator sets has a minimum rotor/stator clearance of greater than about 1.78 mm (0.07 inch).

Figure 3:
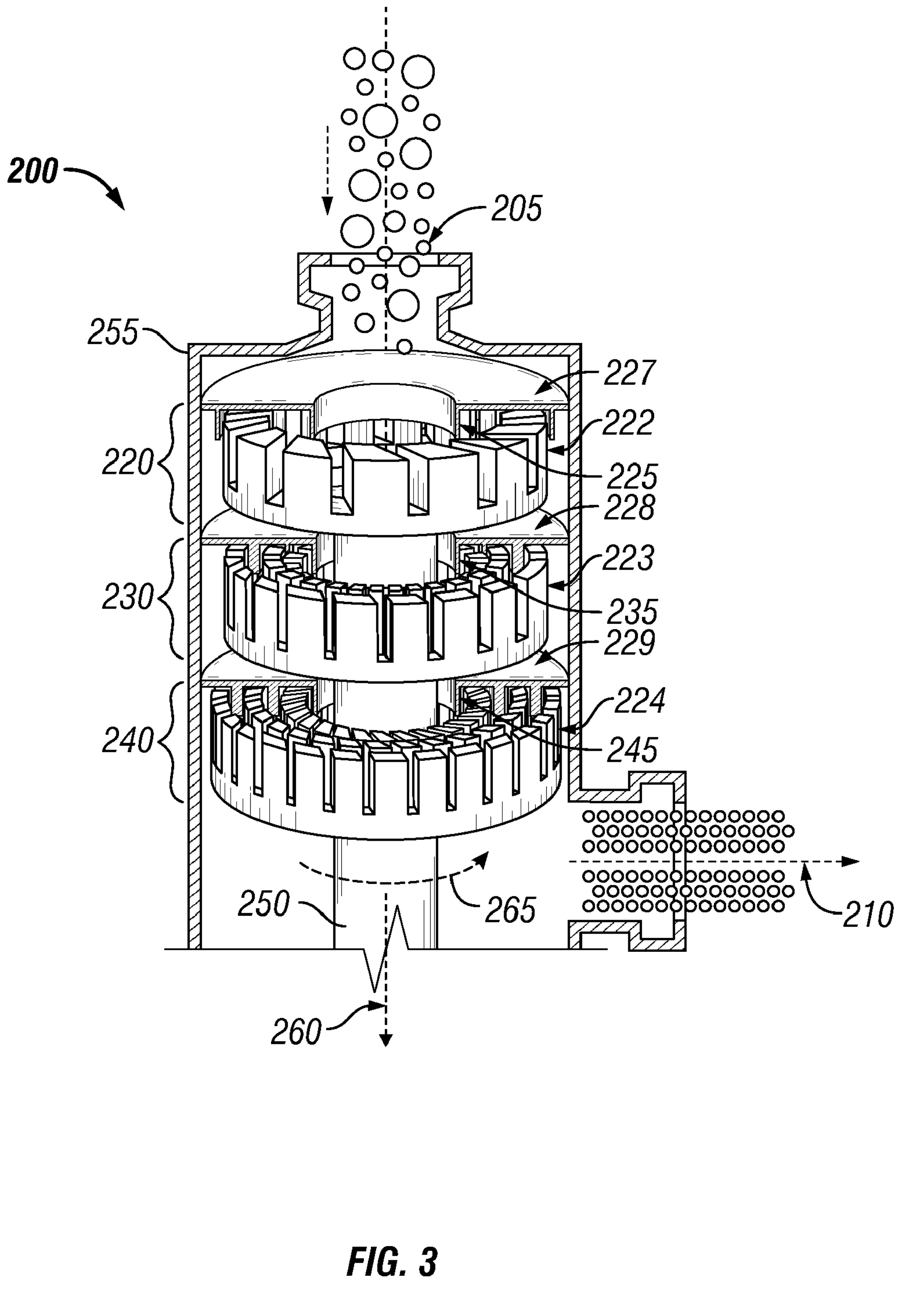
FIG. 3 is a longitudinal cross-section view of a multi-stage high shear device, as employed in an embodiment of the system.

Referring now to FIG. 3, there is presented a longitudinal cross-section of a suitable high shear device 200. High shear device 200 of FIG. 3 is a dispersing device comprising three stages or rotor-stator combinations. High shear device 200 is a dispersing device comprising three stages or rotor-stator combinations, 220, 230, and 240. The rotor-stator combinations may be known as generators 220, 230, 240 or stages without limitation. Three rotor/stator sets or generators 220, 230, and 240 are aligned in series along drive shaft 250.

First generator 220 comprises rotor 222 and stator 227. Second generator 230 comprises rotor 223, and stator 228. Third generator 240 comprises rotor 224 and stator 229. For each generator the rotor is rotatably driven by input 250 and rotates about axis 260 as indicated by arrow 265. The direction of rotation may be opposite that shown by arrow 265 (e.g., clockwise or counterclockwise about axis of rotation 260). Stators 227, 228, and 229 are fixably coupled to the wall 255 of high shear device 200.

As mentioned hereinabove, each generator has a shear gap width which is the minimum distance between the rotor and the stator. In the embodiment of FIG. 3, first generator 220 comprises a first shear gap 225; second generator 230 comprises a second shear gap 235; and third generator 240 comprises a third shear gap 245. In embodiments, shear gaps 225, 235, 245 have widths in the range of from about 0.025 mm to about 10.0 mm. Alternatively, the process comprises utilization of a high shear device 200 wherein the gaps 225, 235, 245 have a width in the range of from about 0.5 mm to about 2.5 mm. In certain instances the shear gap width is maintained at about 1.5 mm. Alternatively, the width of shear gaps 225, 235, 245 are different for generators 220, 230, 240. In certain instances, the width of shear gap 225 of first generator 220 is greater than the width of shear gap 235 of second generator 230, which is in turn greater than the width of shear gap 245 of third generator 240. As mentioned above, the generators of each stage may be interchangeable, offering flexibility. High shear device 200 may be configured so that the shear rate will increase stepwise longitudinally along the direction of the flow 260.

Generators 220, 230, and 240 may comprise a coarse, medium, fine, and super-fine characterization. Rotors 222, 223, and 224 and stators 227, 228, and 229 may be toothed designs. Each generator may comprise two or more sets of rotor-stator teeth. In embodiments, rotors 222, 223, and 224 comprise more than 10 rotor teeth circumferentially spaced about the circumference of each rotor. In embodiments, stators 227, 228, and 229 comprise more than ten stator teeth circumferentially spaced about the circumference of each stator. In embodiments, the inner diameter of the rotor is about 12 cm. In embodiments, the diameter of the rotor is about 6 cm. In embodiments, the outer diameter of the stator is about 15 cm. In embodiments, the diameter of the stator is about 6.4 cm. In some embodiments the rotors are 60 mm and the stators are 64 mm in diameter, providing a clearance of about 4 mm. In certain embodiments, each of three stages is operated with a super-fine generator, comprising a shear gap of between about 0.025 mm and about 4 mm. For applications in which solid particles are to be sent through high shear device 40, the appropriate shear gap width (minimum clearance between rotor and stator) may be selected for an appropriate reduction in particle size and increase in particle surface area. In embodiments, this may be beneficial for increasing catalyst surface area by shearing and dispersing the particles.

High shear device 200 is configured for receiving from line 13 a reactant stream at inlet 205. The reaction mixture comprises hydrogen as the dispersible phase and carbonaceous liquid as the continuous phase. The feed stream may further comprise a particulate solid catalyst component. Feed stream entering inlet 205 is pumped serially through generators 220, 230, and then 240, such that product dispersion is formed. Product dispersion exits high shear device 200 via outlet 210 (and line 18 of FIG. 1). The rotors 222, 223, 224 of each generator rotate at high speed relative to the fixed stators 227, 228, 229, providing a high shear rate. The rotation of the rotors pumps fluid, such as the feed stream entering inlet 205, outwardly through the shear gaps (and, if present, through the spaces between the rotor teeth and the spaces between the stator teeth), creating a localized high shear condition. High shear forces exerted on fluid in shear gaps 225, 235, and 245 (and, when present, in the gaps between the rotor teeth and the stator teeth) through which fluid flows process the fluid and create product dispersion. Product dispersion exits high shear device 200 via high shear outlet 210 (and line 18 of FIG. 1).

The product dispersion has an average gas bubble size less than about 5 μm. In embodiments, HSD 40 produces a dispersion having a mean bubble size of less than about 1.5 μm. In embodiments, HSD 40 produces a dispersion having a mean bubble size of less than 1 μm; preferably the bubbles are sub-micron in diameter. In certain instances, the average bubble size is from about 0.1 μm to about 1.0 μm. In embodiments, HSD 40 produces a dispersion having a mean bubble size of less than 400 nm. In embodiments, HSD 40 produces a dispersion having a mean bubble size of less than 100 nm. High shear device 200 produces a dispersion comprising gas bubbles capable of remaining dispersed at atmospheric pressure for at least about 15 minutes.

Not to be limited by theory, it is known in emulsion chemistry that sub-micron particles, or bubbles, dispersed in a liquid undergo movement primarily through Brownian motion effects. The bubbles in the product dispersion created by high shear device 200 may have greater mobility through boundary layers of solid catalyst particles, thereby facilitating and accelerating the catalytic reaction through enhanced transport of reactants.

In certain instances, high shear device 200 comprises a Dispax Reactor® of IKA® Works, Inc. Wilmington, N.C. and APV North America, Inc. Wilmington, Mass. Several models are available having various inlet/outlet connections, horsepower, tip speeds, output rpm, and flow rate. Selection of the high shear device will depend on throughput requirements and desired particle or bubble size in dispersion in line 18 (FIG. 1) exiting outlet 210 of high shear device 200. IKA® model DR 2000/4, for example, comprises a belt drive, 4M generator, PTFE sealing ring, inlet flange 25.4 mm (1 inch) sanitary clamp, outlet flange 19 mm (¾ inch) sanitary clamp, 2 HP power, output speed of 7900 rpm, flow capacity (water) approximately 300-700 L/h (depending on generator), a tip speed of from 9.4-41 m/s (1850 ft/min to 8070 ft/min).

Vessel Vessel or reactor 10 is any type of vessel in which a multiphase reaction can be propagated to carry out the above-described conversion reaction(s). For instance, a continuous or semi-continuous stirred tank reactor, or one or more batch reactors may be employed in series or in parallel. In some applications vessel 10 may be a tower reactor, and in others a tubular reactor or multi-tubular reactor. Any number of reactor inlet lines is envisioned, with two shown in FIG. 1 (lines 14 and 15). Inlet line may be catalyst inlet line 15 connected to vessel 10 for receiving a catalyst solution or slurry during operation of the system. Vessel 10 may comprise an exit line 17 for vent gas, and an outlet product line 16 for a product stream. In embodiments, vessel 10 comprises a plurality of reactor product lines 16.

Hydrogenation reactions will occur whenever suitable time, temperature and pressure conditions exist. In this sense hydrogenation could occur at any point in the flow diagram of FIG. 1 if temperature and pressure conditions are suitable. Where a circulated slurry based catalyst is utilized, reaction is more likely to occur at points outside vessel 10 shown of FIG. 1. Nonetheless a discrete reactor/vessel 10 is often desirable to allow for increased residence time, agitation and heating and/or cooling. When reactor 10 is utilized, the reactor/vessel 10 may be a fixed bed reactor, a fluidized bed reactor, or a transport bed reactor and may become the primary location for the hydrogenation reaction to occur due to the presence of catalyst and its effect on the rate of hydrogenation.

Thus, vessel 10 may be any type of reactor in which hydrodesulfurization may propagate. For example, vessel 10 may comprise one or more tank or tubular reactor in series or in parallel. The reaction carried out by high shear process 1 may comprise a homogeneous catalytic reaction in which the catalyst is in the same phase as another component of the reaction mixture or a heterogeneous catalytic reaction involving a solid catalyst. Optionally, as discussed in Example 1 hereinbelow, the hydrodesulfurization reaction may occur without the use of catalyst via the use of high shear device 40. When vessel 10 is utilized, vessel 10 may be operated as slurry reactor, fixed bed reactor, trickle bed reactor, fluidized bed reactor, bubble column, or other method known to one of skill in the art. In some applications, the incorporation of external high shear device 40 will permit, for example, the operation of trickle bed reactors as slurry reactors. This may be useful, for example, for reactions including, but not limited to, hydrodenitrogenation, hydrodesulfurization, and hydrodeoxygenation.

Vessel 10 may include one or more of the following components: stirring system, heating and/or cooling capabilities, pressure measurement instrumentation, temperature measurement instrumentation, one or more injection points, and level regulator (not shown), as are known in the art of reaction vessel design. For example, a stirring system may include a motor driven mixer. A heating and/or cooling apparatus may comprise, for example, a heat exchanger. Alternatively, as much of the conversion reaction may occur within HSD 40 in some embodiments, vessel 10 may serve primarily as a storage vessel in some cases. Although generally less desired, in some applications vessel 10 may be omitted, particularly if multiple high shear devices/reactors are employed in series, as further described below.

Heat Transfer Devices. In addition to the above-mentioned heating/cooling capabilities of vessel 10, other external or internal heat transfer devices for heating or cooling a process stream are also contemplated in variations of the embodiments illustrated in FIG. 1. For example, if the reaction is exothermic, reaction heat may be removed from vessel 10 via any method known to one skilled in the art. The use of external heating and/or cooling heat transfer devices is also contemplated. Some suitable locations for one or more such heat transfer devices are between pump 5 and HSD 40, between HSD 40 and vessel 10, and between vessel 10 and pump 5 when system 1 is operated in multi-pass mode. Some non-limiting examples of such heat transfer devices are shell, tube, plate, and coil heat exchangers, as are known in the art.

Pumps. Pump 5 is configured for either continuous or semi-continuous operation, and may be any suitable pumping device that is capable of providing greater than 202.65 kPa (2 atm) pressure, preferably greater than 303.975 kPa (3 atm)

pressure, to allow controlled flow through HSD 40 and system 1. For example, a Roper Type 1 gear pump, Roper Pump Company (Commerce Ga.) Dayton Pressure Booster Pump Model 2P372E, Dayton Electric Co (Niles, Ill.) is one suitable pump. Preferably, all contact parts of the pump comprise stainless steel, for example, 316 stainless steel. In some embodiments of the system, pump 5 is capable of pressures greater than about 2026.5 kPa (20 atm). In addition to pump 5, one or more additional, high pressure pump (not shown) may be included in the system illustrated in FIG. 1. For example, a booster pump, which may be similar to pump 5, may be included between HSD 40 and vessel 10 for boosting the pressure into vessel 10, or a recycle pump may be positioned on line 17 for recycling gas from vessel 10 to HSD 40. As another example, a supplemental feed pump, which may be similar to pump 5, may be included for introducing additional reactants or catalyst into vessel 10.

Production of Hydrogen Sulfide by Hydrodesulfurization of Carbonaceous Fluid Comprising Sulfur-Containing Compounds.

Operation of high shear desulfurization system 1 will now be discussed with reference to FIG. 1. In operation for the hydrodesulfurization of fluids, a dispersible hydrogen-containing gas stream is introduced into system 1 via line 22, and combined in line 13 with a liquid stream comprising sulfur-containing compounds. The liquid stream comprising sulfur-containing compounds that may be reduced by the system and methods disclosed herein and may be removed from the fluids may be a variety of types. In embodiments, the fluids comprise carbon, and are referred to as carbonaceous fluids. The carbon in the carbonaceous fluids may be part of carbon-containing compounds or substances. The carbon-containing compounds or substances may be hydrocarbons. The carbonaceous fluid may comprise liquid hydrocarbons, such as, but not limited to, fossil fuels, crude oil or crude oil fractions, diesel fuel, gasoline, kerosene, light oil, petroleum fractions, and combinations thereof. Another type of carbonaceous fluid comprises liquefied hydrocarbons such as liquefied petroleum gas. In embodiments, the carbonaceous fluid is a petroleum-based fluid. Liquid stream in line 13 may comprise naphtha, diesel oil, heavier oils, and combinations thereof, for example.

In embodiments, the disclosed system and method are used for hydrofinishing. In petroleum refining, hydrofinishing is the process carried out in the presence of hydrogen to improve the properties of low viscosity-index naphthenic and medium-viscosity naphthenic oils. Hydrofinishing may also be applied to paraffin waxes and for removal of undesirable components. Hydrofinishing consumes hydrogen and may be used rather than acid treating. The final step in today's base oil plants, hydrofinishing uses advanced catalysts and high pressures (above 1,000 psi) to give a final polish to base oils. By hydrofinishing, remaining impurities are converted to stable base oil molecules (e.g. UV stable). Hydrofinishing is also used to refer to both the finishing of oil previously refined by hydrocracking or solvent extraction, as well as the hydrotreatment of straight-run lube distillates into finished lube products. These lube products include naphthenic and paraffinic oils. The disclosed system and method may be used to saturate double bonds in a hydrocarbonaceous feedstream.

In embodiments, the feedstream comprises a thermally cracked petroleum fraction such as coker naphtha, a catalytically cracked petroleum fraction such as FCC naphtha, or a combination thereof. In embodiments, liquid feedstream comprises naphtha fraction boiling in the gasoline boiling range. In embodiments, liquid feedstream comprises naphtha fraction boiling in the gasoline boiling range. In embodiments, the carbonaceous feedstream comprises a catalytically cracked petroleum fraction. In embodiments, carbonaceous feedstream comprises a FCC naphtha fraction a boiling range within the range of 149° C. (300° F.) to 260° C. (500° F.). In embodiments, carbonaceous feedstream comprises a thermally cracked petroleum fraction. In embodiments, the carbonaceous feedstream comprises coker naphtha having a boiling range within the range of 165° C. (330° F.) to 215° C. (420° F.). In embodiments, the carbonaceous feedstream comprises FCC C6+ naphtha.

Liquid stream in line 13 comprising sulfur-containing compounds may contain a variety of organic sulfur compounds, such as, but not limited to, thiols, thiophenes, organic sulfides and disulfides, and others. The hydrogen-containing gas may be substantially pure hydrogen, or a gas stream comprising hydrogen. Without wishing to be limited by theory, hydrogen serves multiple roles, including generation of anion vacancy by removal of sulfide, hydrogenolysis [cleavage of C-X chemical bond where C is carbon atom and X is nitrogen atom (hydrodenitrogenation), oxygen atom (hydrodeoxygenation), or sulfur atom (hydrodesulfurization)], and hydrogenation (net result is addition of hydrogen).

In embodiments, the hydrogen-containing gas is fed directly into HSD 40, instead of being combined with the liquid reactant stream (i.e., carbonaceous fluid) in line 13. Pump 5 may be operated to pump the liquid reactant (carbonaceous fluid comprising sulfur-containing compounds) through line 21, and to build pressure and feed HSD 40, providing a controlled flow throughout high shear device (HSD) 40 and high shear system 1. In some embodiments, pump 5 increases the pressure of the HSD inlet stream to greater than 202.65 kPa (2 atm), preferably greater than about 303.975 kPa (3 atmospheres). In this way, high shear system 1 may combine high shear with pressure to enhance reactant intimate mixing.

In embodiments, reactants and, if present, catalyst (for example, aqueous solution, and catalyst) are first mixed in vessel 10. Reactants enter vessel 10 via, for example, inlet lines 14 and 15. Any number of vessel inlet lines is envisioned, with two shown in FIG. 1 (via lines 14 and 15). In an embodiment, vessel 10 is charged with catalyst and the catalyst if required, is activated according to procedures recommended by the catalyst vendor(s).

After pumping, the hydrogen and liquid reactants (sulfur-containing compounds in carbonaceous stream in line 13) are mixed within HSD 40, which serves to create a fine dispersion of the hydrogen-containing gas in the carbonaceous fluid. In HSD 40, the hydrogen-containing gas and carbonaceous fluid are highly dispersed such that nanobubbles, submicron-sized bubbles, and/or microbubbles of the gaseous reactants are formed for superior dissolution into solution and enhancement of reactant mixing. For example, disperser IKA® model DR 2000/4, a high shear, three stage dispersing device configured with three rotors in combination with stators, aligned in series, may be used to create the dispersion of dispersible hydrogen-containing gas in liquid medium comprising sulfur-containing compounds (i.e., "the reactants"). The rotor/stator sets may be configured as illustrated in FIG. 3, for example. The combined reactants enter the high shear device via line 13 and enter a first stage rotor/stator combination. The rotors and stators of the first stage may have circumferentially spaced first stage rotor teeth and stator teeth, respectively. The coarse dispersion exiting the first stage enters the second rotor/stator stage. The rotor and stator of the second stage may also comprise circumferentially spaced rotor teeth and stator teeth, respectively. The reduced bubble-size dispersion emerging from the second stage enters the third stage rotor/ stator combination, which may comprise a rotor and a stator having rotor teeth and stator teeth, respectively. The dispersion exits the high shear device via line 18. In some embodiments, the shear rate increases stepwise longitudinally along the direction of the flow, 260.

For example, in some embodiments, the shear rate in the first rotor/stator stage is greater than the shear rate in subsequent stage(s). In other embodiments, the shear rate is substantially constant along the direction of the flow, with the shear rate in each stage being substantially the same.

If the high shear device 40 includes a PTFE seal, the seal may be cooled using any suitable technique that is known in the art. For example, the reactant stream flowing in line 13 may be used to cool the seal and in so doing be preheated as desired prior to entering high shear device 40.

The rotor(s) of HSD 40 may be set to rotate at a speed commensurate with the diameter of the rotor and the desired tip speed. As described above, the high shear device (e.g., colloid mill or toothed rim disperser) has either a fixed clearance between the stator and rotor or has adjustable clearance. HSD 40 serves to intimately mix the hydrogen-containing gas and the reactant liquid (i.e., liquid stream in line 13 comprising sulfur-containing compounds). In some embodiments of the process, the transport resistance of the reactants is reduced by operation of the high shear device such that the velocity of the reaction is increased by greater than about 5%. In some embodiments of the process, the transport resistance of the reactants is reduced by operation of the high shear device such that the velocity of the reaction is increased by greater than a factor of about 5. In some embodiments, the velocity of the reaction is increased by at least a factor of 10. In some embodiments, the velocity is increased by a factor in the range of about 10 to about 100 fold.

In some embodiments, HSD 40 delivers at least 300 L/h at a tip speed of at least 4500 ft/min, and which may exceed 7900 ft/min (40 m/s). The power consumption may be about 1.5 kW. Although measurement of instantaneous temperature and pressure at the tip of a rotating shear unit or revolving element in HSD 40 is difficult, it is estimated that the localized temperature seen by the intimately mixed reactants is in excess of 500° C. and at pressures in excess of 500 kg/cm$^2$ under cavitation conditions. The high shear mixing results in dispersion of the hydrogen-containing gas in micron or submicron-sized bubbles. In some embodiments, the resultant dispersion has an average bubble size less than about 1.5 μm. Accordingly, the dispersion exiting HSD 40 via line 18 comprises micron and/or submicron-sized gas bubbles. In some embodiments, the mean bubble size is in the range of about 0.4 μm to about 1.5 μm. In some embodiments, the resultant dispersion has an average bubble size less than 1 μm. In some embodiments, the mean bubble size is less than about 400 nm, and may be about 100 nm in some cases. In many embodiments, the microbubble dispersion is able to remain dispersed at atmospheric pressure for at least 15 minutes.

Once dispersed, the resulting gas/liquid or gas/liquid/solid dispersion exits HSD 40 via line 18 and feeds into vessel 10, as illustrated in FIG. 1. As a result of the intimate mixing of the reactants prior to entering vessel 10, a significant portion of the chemical reaction may take place in HSD 40, with or without the presence of a catalyst. Accordingly, in some embodiments, reactor/vessel 10 may be used primarily for heating and separation of product hydrogen sulfide gas from the carbonaceous fluid. Alternatively, or additionally, vessel 10 may serve as a primary reaction vessel where most of the hydrogen sulfide product is produced. For example, in embodiments, vessel 10 is a fixed bed reactor comprising a fixed bed of catalyst.

Vessel/reactor 10 may be operated in either continuous or semi-continuous flow mode, or it may be operated in batch mode. The contents of vessel 10 may be maintained at a specified reaction temperature using heating and/or cooling capabilities (e.g., cooling coils) and temperature measurement instrumentation. Pressure in the vessel may be monitored using suitable pressure measurement instrumentation, and the level of reactants in the vessel may be controlled using a level regulator (not shown), employing techniques that are known to those of skill in the art. The contents may be stirred continuously or semi-continuously.

Catalyst. If a catalyst is used to promote the reduction of sulfur-containing species, the catalyst may be introduced into vessel 10 via lines 14 and/or 15, as a slurry or catalyst stream. Alternatively, or additionally, catalyst may be added elsewhere in system 1. For example, catalyst slurry may be injected into line 21. In some embodiments, line 21 may contain a flowing carbonaceous fluid stream and/or a recycle stream from, for example, vessel 10 may be connected via line 16 to line 21.

In embodiments, vessel/reactor 10 comprises any catalyst known to those of skill in the art to be suitable for hydrodesulfurization. A suitable soluble catalyst may be a supported metal sulfide. In embodiments, the metal sulfide is selected from molybdenum sulfide, cobalt sulfide, ruthenium sulfide, and combinations thereof. In embodiments, the catalyst comprises ruthenium sulfide. In embodiments, the catalyst comprises a binary combination of molybdenum sulfide and cobalt sulfide. In embodiments, the support comprises alumina. In embodiments, the catalyst comprises an alumina base impregnated with cobalt and/or molybdenum. The catalyst used in the hydrodesulfurization step may be a conventional desulfurization catalyst made up of a Group VI and/or a Group VIII metal on a suitable refractory support. In embodiments, the hydrotreating catalyst comprises a refractory support selected from the group consisting of silica, alumina, silica-alumina, silica-zirconia, silica-titania, titanium oxide, and zirconium oxide. The Group VI metal may be molybdenum or tungsten and the Group VIII metal usually nickel or cobalt. The hydrodesulfurization catalyst may comprise a high surface area γ-alumina carrier impregnated with mixed sulfides, typically of CoMo or NiMo. In embodiments, the hydrodesulfurization catalyst comprises $MoS_2$ together with smaller amounts of other metals, selected from the group consisting of molybdenum, cobalt, nickel, iron and combinations thereof. In embodiments, the catalyst comprises zinc oxide. In embodiments, the catalyst comprises a conventional presulfided molybdenum and nickel and/or cobalt hydrotreating catalyst.

In embodiments, the catalyst is in the aluminosilicate form. In embodiments, the catalyst is intermediate pore size zeolite, for example, zeolite having the topology of ZSM-5. Although the catalyst may be subjected to chemical change in the reaction zone due to the presence of hydrogen and sulfur therein, the catalyst may be in the form of the oxide or sulfide when first brought into contact with the carbonaceous feedstream. When the system and method are focused on hydrodenitrogentaion, cobalt promoted molybdenum on alumina catalysts may be selected for hydrodesulfurization. For hydrodenitrogenation, nickel promoted molybdenum on alumina catalysts may be a desired catalyst.

The catalyst may be regenerable by contact at elevated temperature with hydrogen gas, for example, or by burning in air or other oxygen-containing gas.

In embodiments, vessel 10 comprises a fixed bed of suitable catalyst. In some embodiments, the catalyst is added continuously to vessel 10 via line 15. In embodiments, the use of an external pressurized high shear device reactor provides for hydrodesulfurization without the need for catalyst, as discussed further in Example 1 hereinbelow.

The bulk or global operating temperature of the reactants is desirably maintained below their flash points. In some embodiments, the operating conditions of system 1 comprise a temperature in the range of from about 100° C. to about 230° C. In embodiments, the temperature is in the range of from about 160° C. to 180° C. In specific embodiments, the reaction temperature in vessel 10, in particular, is in the range of from about 155° C. to about 160° C. In some embodiments, the reaction pressure in vessel 10 is in the range of from about 202.65 kPa (2 atm) to about 5.6 MPa-6.1 MPa (55-60 atm). In some embodiments, reaction pressure is in the range of from about 810.6 kPa to about 1.5 MPa (8 atm to about 15 atm). In embodiments, vessel 10 is operated at or near atmospheric pressure. In embodiments, for example for naphtha hydrofinishing, the vessel 10 pressure may be from about 345 kPa (50 psi) to about 10.3 MPa (1500 psi), and the reaction temperature in the range of from about 260° C. (500° F.) to about 427° C. (800° F.). In embodiments, for example for naphtha hydrofinishing, the vessel 10 pressure may be from about 2.0 MPa (300 psi) to about 6.9 MPa (1000 psi), and the reaction temperature in the range of from about 371° C. (700° F.) to about 427° C. (800° F.).

Optionally, the dispersion may be further processed prior to entering vessel 10, if desired. In vessel 10, hydrodesulfurization occurs/continues via reduction with hydrogen. The contents of the vessel may be stirred continuously or semi-continuously, the temperature of the reactants may be controlled (e.g., using a heat exchanger), and the fluid level inside vessel 10 may be regulated using standard techniques. Hydrogen sulfide gas may be produced either continuously, semi-continuously or batch wise, as desired for a particular application. Product hydrogen sulfide gas that is produced may exit vessel 10 via gas line 17. This gas stream may comprise unreacted hydrogen, as well as product hydrogen sulfide gas, for example. In embodiments the reactants are selected so that the gas stream comprises less than about 6% unreacted hydrogen by weight. In some embodiments, the reaction gas stream in line 17 comprises from about 1% to about 4% hydrogen by weight. The reaction gas removed via line 17 may be further treated, and the components may be recycled, as desired.

The reaction product stream exits vessel 10 by way of line 16. In embodiments, product stream in line 16 comprises dissolved hydrogen sulfide gas, and is treated for removal of hydrogen sulfide therefrom as discussed further hereinbelow. In other embodiments, it is envisioned that product hydrogen sulfide gas exits vessel 10 via line 17 and liquid product comprising carbonaceous fluid from which sulfur-containing compounds have been removed exits vessel 10 via line 16.

Multiple Pass Operation. In the embodiment shown in FIG. 1, the system is configured for single pass operation, wherein the output 16 from vessel 10 goes directly to further processing for recovery of sulfur and carbonaceous fluid. In some embodiments it may be desirable to pass the contents of vessel 10, or a liquid fraction containing unreacted sulfur-containing compounds, through HSD 40 during a second pass. In this case, line 16 may be connected to line 21 as indicated by dashed line 20, such that at least a portion of the contents of line 16 is recycled from vessel 10 and pumped by pump 5 into line 13 and thence into HSD 40. Additional hydrogen-containing gas may be injected via line 22 into line 13, or it may be added directly into the high shear device (not shown). In other embodiments, product stream in line 16 may be further treated (for example, hydrogen sulfide gas removed therefrom) prior to recycle of a portion of the undesulfurized liquid in product stream being recycled to high shear device 40.

Multiple High Shear Mixing Devices. In some embodiments, two or more high shear devices like HSD 40, or configured differently, are aligned in series, and are used to further enhance the reaction. Their operation may be in either batch or continuous mode. In some instances in which a single pass or "once through" process is desired, the use of multiple high shear devices in series may also be advantageous. In some embodiments where multiple high shear devices are operated in series, vessel 10 may be omitted. For example, in embodiments, outlet dispersion in line 18 may be fed into a second high shear device. When multiple high shear devices 40 are operated in series, additional hydrogen gas may be injected into the inlet feedstream of each device. In some embodiments, multiple high shear devices 40 are operated in parallel, and the outlet dispersions therefrom are introduced into one or more vessel 10.

Downstream Processing

FIG. 2 is a schematic of another embodiment of high shear system 300, in which high shear device 40, as described above, is incorporated into a conventional industrial hydrodesulfurization unit, such as found in a refinery. HDS system 300 comprises feed pump 5 by which liquid pump inlet line 21 comprising the liquid to be hydrodesulfurized is pumped to external high shear device 40 to enhance the hydrodesulfurization process. In the present invention the high shear device 40 is utilized in combining and reacting hydrogen containing gas 22 with sulfur-containing compounds, as noted above, found in petroleum products that are normally subject to hydrodesulfurization. The pressure of liquid phase feed stream in line 21 is increased via pump 5. As described hereinabove, pump 5 may be a positive displacement, or gear pump. Pump outlet stream in line 13 is mixed with dispersible hydrogen-containing reactant stream via line 22 and introduced to the inlet (205 in FIG. 3, for example) of external high shear device 40 via high shear device inlet line 13. Positive displacement pump (or gear pump) 5 feeds and meters the gas liquid mix into the inlet of external high shear device 40. As discussed hereinabove, mixing within external high shear device 40 creates a dispersion comprising microbubbles (and/or submicrometer size bubbles) of hydrogen and promotes reaction conditions for the reaction of hydrogen with sulfur compounds in the organic feedstock. Therefore, high shear device outlet stream in line 18 comprises a dispersion of micron and/or submicron-sized gas bubbles, as discussed hereinabove. Conventionally, liquid feed is pumped via line 21 to an elevated pressure and is joined by gas in line 22 comprising hydrogen-rich recycle gas, the resulting mixture is preheated (perhaps by heat exchange via heat exchanger), and the preheated feed stream is then sent to a fired heater (not shown) wherein the feed mixture is vaporized and heated to elevated temperature before entering vessel 10. By contrast, in high shear hydrodesulfurization system 300, dispersion in line 18 from high shear device 40 comprises a dispersion of hydrogen-containing gas bubbles in liquid phase comprising carbonaceous liquids and sulfur-containing compounds. Within fixed bed reactor 10, hydrodesulfurization takes place as reactor inlet dispersion in line 18 flows through a fixed bed of catalyst. In embodiments, reactor 10 comprises a trickle bed reactor. In embodiments, the hydrodesulfurization reaction in reactor 10 takes place at temperatures ranging from 100° C. to 400° C. and elevated pressures ranging from 101.325 kPa-13.2 MPa (1 atmospheres to 130 atmospheres) of absolute pressure, in the presence of a catalyst.

Hot reaction products in line 16 may be partially cooled by flowing through heat exchanger 80 which may also serve to preheat reactor feed in line 21. Heat-exchanged reactor product stream in line 42 then flows through a water-cooled heat exchanger before undergoing a pressure reduction (shown as pressure controller, PC, 50) down to about 303.9 kPa-506.6 kPa (3 to 5 atmospheres). The resulting mixture of liquid and gas in line 43 enters gas separator vessel 60 at, for example, about 35° C. and 303.9 kPa-506.6 kPa (3 to 5 atmospheres) of absolute pressure.

Hydrogen-rich gas in line 44 from gas separator vessel 60 is routed through amine contactor 30 for removal of the reaction product $H_2S$ that it contains. Ammonia may also be removed from the product gas and recovered for fertilizer applications, for example. A portion of $H_2S$-free hydrogen-rich gas in line 54 is recycled back for reuse in high shear device 40 and reactor 10, while line 53 may direct a portion of $H_2S$-free hydrogen-rich gas elsewhere (such as, for example, purge) via line 54. A portion of hydrogen-sulfide rich gas in line 44 from gas separator vessel 60 may be separated from line 44 via line 45, as discussed further hereinbelow. The hydrogen sulfide removed and recovered by the amine gas treating unit 30 in the hydrogen sulfide rich amine stream in line 48 may be further converted to elemental sulfur (e.g., in a Claus process unit). The Claus process may be used to oxidize hydrogen sulfide gas to produce water and recover elemental sulfur.

Liquid stream in line 49 from gas separator vessel 60 may be sent for downstream processing. In FIG. 2, for example, downstream processing comprises reboiled stripper distillation tower 70, whereby sour gas is removed in gas line 51 from the bottoms stream in line 52 which comprises the desulfurized liquid product. Sour gas from the stripping of the reaction product liquid, in line 51, may be sent, optionally with sour gas in line 45 to a central processing plant. Overhead sour gas in line 51 from stripper 70 may comprise hydrogen, methane, ethane, hydrogen sulfide, propane, and perhaps butane and heavier hydrocarbons. Treatment of this gas (not shown in FIG. 2) may recover propane, butane, and pentane or heavier components. Residual hydrogen, methane, ethane, and some propane may be used as refinery fuel gas. If the liquid feed in line 21 comprises olefins, overhead sour gas in line 51 may also comprise ethane, propene, butenes, and pentenes or heavier components. The amine solution introduced into absorber 30 via inlet 47 may be directed from a main amine gas treating unit within the refinery (not shown in FIG. 2) and hydrogen-sulfide rich amine in absorber outlet line 48 may be returned to the refinery's main amine gas treating unit (not shown in FIG. 2).

Hydrotreated/hydrofinished liquid product in line 52 may be sent to, for example, a catalytic reforming process to increase the octane value (which may be reduced via the hydrotreatment/hydrofinishing). Catalytic reforming of the desulfided product in line 52 will produce hydrogen which may, in embodiments, be recycled to HDS 40.

The increased surface area of the micrometer sized and/or submicrometer sized hydrogen bubbles in the dispersion in line 18 produced within high shear device 40 results in faster and/or more complete reaction of hydrogen gas with sulfur compounds within the feed stream introduced via line 21. As mentioned hereinabove, additional benefits are the ability to operate vessel 10 at lower temperatures and pressures resulting in both operating and capital cost savings. Operation of hydrotreater/hydrofinisher 10 at lower temperature may minimize undesirable octane reduction of the carbonaceous feedstream. The benefits of the present invention include, but are not limited to, faster cycle times, increased throughput, reduced operating costs and/or reduced capital expense due to the possibility of designing smaller reactors, and/or operating the reactor at lower temperature and/or pressure and the possible elimination of catalyst.

In embodiments, the high shear hydrodesulfurization system and method of this disclosure are suitable for the reduction of total sulfur down to the parts-per-million range, whereby poisoning of noble metal catalysts in subsequent catalytic reforming steps (e.g., subsequent catalytic reforming of naphtha) is prevented/reduced. In embodiments, the feedstock comprises diesel oils, and the HDS system and method serve to reduce the sulfur content of the fuel such that it meets Ultra-low sulfur diesel (ULSD). In embodiments, the sulfur content of the fuel is less than about 300 ppm by weight. In embodiments, less than about 30 pm by weight. In other embodiments, less than about 15 pm by weight.

The hydrogenolysis reaction may also be used to reduce the nitrogen content of the feedstock (hydrodenitrogenation or HDN). In embodiments, the system and method for the hydrodesulfurization of a feedstream also serves to simultaneously denitrogenate the stream to some extent as well. The disclosed system and method may also be used to saturate (hydrogenate) hydrocarbons, for example to convert olefins into paraffins. In embodiments, the disclosed system and method may be used alone for the saturation of olefins or may be used to simultaneously desulfurize, denitrogenate, and/or saturate alkenes to corresponding alkanes. The disclosed system and method may be used as a hydrofinishing process (for example, hydrofinishing of streams comprising naphtha) to remove the non-hydrocarbon constituents (for example, sulfur, nitrogen, etc.) and/or to improve the physicochemical properties of the produced oils such as color, viscosity index, inhibition responses, oxidation and thermal stability.

The application of enhanced mixing of the reactants by HSD 40 potentially permits greater hydrodesulfurization of carbonaceous streams. In some embodiments, the enhanced mixing potentiates an increase in throughput of the process stream. In some embodiments, the high shear mixing device is incorporated into an established process, thereby enabling an increase in production (i.e., greater throughput). In contrast to some methods that attempt to increase the degree of hydrodesulfurization by simply increasing reactor pressures, the superior dispersion and contact provided by external high shear mixing may allow in many cases a decrease in overall operating pressure while maintaining or even increasing reaction rate. Without wishing to be limited to a particular theory, it is believed that the level or degree of high shear mixing is sufficient to increase rates of mass transfer and also produces localized non-ideal conditions that enable reactions to occur that would not otherwise be expected to occur based on Gibbs free energy predictions. Localized non ideal conditions are believed to occur within the high shear device resulting in increased temperatures and pressures with the most significant increase believed to be in localized pressures. The increase in pressures and temperatures within the high shear device are instantaneous and localized and quickly revert back to bulk or average system conditions once exiting the high shear device. In some cases, the high shear mixing device induces cavitation of sufficient intensity to dissociate one or more of the reactants into free radicals, which may intensify a chemical reaction or allow a reaction to take place at less stringent conditions than might otherwise be required. Cavitation may also increase rates of transport processes by producing local turbulence and liquid micro-circulation (acoustic streaming). An overview of the application of cavitation phenomenon in chemical/physical processing applications is provided by Gogate et al., "Cavitation: A technology on the horizon," Current Science 91 (No. 1): 35-46 (2006). The high shear mixing device of certain embodiments of the present system and methods induces cavitation whereby hydrogen and sulfur-containing compounds are dissociated into free radicals, which then react to produce product comprising hydrogen sulfide gas.

In some embodiments, the system and methods described herein permit design of a smaller and/or less capital intensive process than previously possible without the use of external high shear device 40. Potential advantages of certain embodiments of the disclosed methods are reduced operating costs and increased production from an existing process. Certain embodiments of the disclosed processes additionally offer the advantage of reduced capital costs for the design of new processes. In embodiments, dispersing hydrogen-containing gas in carbonaceous fluid comprising sulfur-containing compounds with high shear device 40 decreases the amount of unreacted sulfur-containing compounds. Potential benefits of some embodiments of this system and method for hydrodesulfurization include, but are not limited to, faster cycle times, increased throughput, higher conversion, reduced operating costs and/or reduced capital expense due to the possibility of designing smaller reactors and/or operating the process at lower temperature and/or pressure.

In embodiments, use of the disclosed process comprising reactant mixing via external high shear device 40 allows use of lower temperature and/or pressure in vessel/reactor 10 than previously permitted. In embodiments, the method comprises incorporating external high shear device 40 into an established process thereby reducing the operating temperature and/or pressure of the reaction in external high shear device 40 and/or enabling the increase in production (greater throughput) from a process operated without high shear device 40. In embodiments, vessel 10 is used mainly for cooling of fluid, as much of the reaction occurs in external high shear device 40. In embodiments, vessel 10 is operated at near atmospheric pressure. In embodiments, most of the reaction occurs within the external high shear device 40. In embodiments the hydrodesulfurization occurs mainly in the high shear device without the use of catalyst.

The present methods and systems for hydrodesulfurization of carbonaceous fluids via liquid phase reduction with hydrogen employ an external high shear mechanical device to provide rapid contact and mixing of chemical ingredients in a controlled environment in the reactor/high shear device. The high shear device reduces the mass transfer limitations on the reaction and thus increases the overall reaction rate, and may allow substantial reaction of sulfur with hydrogen under global operating conditions under which substantial reaction may not be expected to occur.

EXAMPLES

Example 1

Desulfurization Using High Shear

Figure 4:
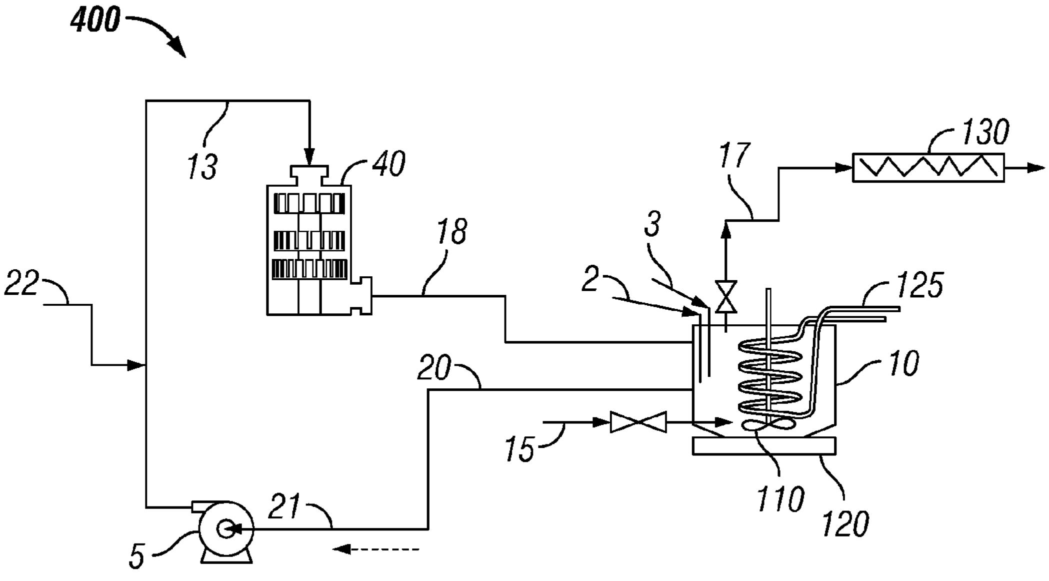
FIG. 4 is a schematic of the apparatus used for the hydrodesulfurization process in Example 1.

An external IKA MK 2000 mill (high shear reactor/device 40) from IKA Works, Inc Wilmington, N.C. was connected to a ten liter stirred reactor vessel 10. The apparatus used for the hydrodesulfurization process in this example is shown schematically in FIG. 4.

The ten liter reactor vessel 10 was made by welding a section of ten-inch diameter stainless steel pipe with a base plate and a head plate equipped with an agitator shaft and seal. Paddle agitator 110 served to stir the contents of vessel 10.

Vessel 10 was charged with eight liters of high sulfur Middle East crude oil. The analysis of this oil is shown in Table 1.

TABLE 1

Crude Oil Analysis

| TEST | METHOD | RESULT | UNITS |
|---|---|---|---|
| Sulfur content | ASTM D 4294 | 4.882 | Weight % |
| API Gravity @60° F. | ASTM D 5002 | 18.27 | ° |
| Density @60° F. | ASTM D 5002 | 0.9438 | g/mL |
| Specific Gravity @ 60° F. | ASTM D 5002 | 0.9448 | — |

Vessel 10 was sealed and circulation initiated with heating. Recirculating pump 5 was a Roper Type 1 gear pump, Roper Pump Company (Commerce Ga.). System 400 comprised vessel 10 with agitator 110 and heating mantle 120. Base oil was placed into pressure vessel 10 that included an internal paddle agitator 110 and a cooling coil 125. Vessel 10 also comprised a gas injection valve 15, pressure relief valve 17, discharge valve 20, temperature probe 2 and pressure gauge 3. Heating mantle 120 was used to heat vessel/reactor 10.

Hydrogen gas 22 was fed into the inlet of high shear unit 40 at ambient temperature, and gas flow was regulated by means of a pressure relief valve (not shown) between the supply manifold (not shown) and the reactor high shear device 40. The hydrogenation reaction was then carried out, maintaining the flow of hydrogen into the reactor, and maintaining the specified temperature for the indicated period of time. Purified Hydrogen Gas, Standard IS:HY 200, Grade II having a purity of 99.9% (+), and was obtained from Airgas Corp. No catalyst was used in this experiment although a hydrodesulfurization catalyst, known to those in the art, could be utilized if desired.

The high shear device 40 was set to 60 Hz. The oil was heated to 150° C. (using heating mantle 120) over a period of 2 hours and then the high shear device 40 was raised to 85 Hz. Outlet pressure from pump 5 was 140 psig and the pressure at vessel 10 was 50 psig.

A vacuum was drawn on vessel 10 through condenser 130 cooled by water. This was used to vent, via vent 17, excess hydrogen, hydrogen sulfide, amines, water and other volatiles produced in the hydrodesulfurization process.

The hydrodesulfurization process was continued for an additional hour. Temperatures measured at the reactor increased to 168° C. and the run was terminated and the oil allowed to cool to room temperature after which the hydrodesulfurized oil product was removed from the reactor, and its composition determined.

The analysis of the hydrodesulfurized oil is presented in Table 2.

TABLE 2

Analysis of Hydrodesulfurized Oil

| TEST | METHOD | RESULT | UNITS |
|---|---|---|---|
| Sulfur content | ASTM D 4294 | 2.357 | Weight % |
| API Gravity @60° F. | ASTM D 5002 | 16.74 | ° |
| Density @60° F. | ASTM D 5002 | 0.9545 | g/mL |
| Specific Gravity @ 60° F. | ASTM D 5002 | 0.9536 | — |

The results in Table 2 indicate over a 50% reduction in sulfur content of the crude oil using the high shear system and process of the present disclosure.

While preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, and so forth). Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, and the like.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the preferred embodiments of the present invention. The disclosures of all patents, patent applications, and publications cited herein are hereby incorporated by reference, to the extent they provide exemplary, procedural or other details supplementary to those set forth herein.

What is claimed is:

1. A system for a hydrodesulfurization, hydrodenitrogenation, or hydrofinishing catalytic reaction comprising:

at least one high shear mixing device comprising at least one rotor and at least one stator separated by a shear gap in the range of from about 0.02 mm to about 5 mm, wherein the shear gap is the minimum distance between the at least one rotor and the at least stator, and wherein the high shear mixing device is configured to produce a dispersion of hydrogen-containing gas bubbles in a liquid phase;

a pump configured for delivering a liquid stream comprising liquid phase to the high shear mixing device; and a vessel configured for receiving the dispersion from the high shear device and for maintaining a predetermined bulk pressure and temperature for the hydrodesulfurization, hydrodenitrogenation, or hydrofinishing catalytic reaction.

2. The system of claim 1, wherein the predetermined bulk pressure is in the range of about 600 kPa to about 6.1 MPa, and wherein the predetermined bulk temperature is in the range of about 260° C. to about 427° C.

3. The system of claim 2, the system further comprising:

a gas separator for receiving a product stream comprising from the vessel; and an absorber configured to receive and clean a gas separator outlet stream, resulting in a cleaned gas stream.

4. The system of claim 3, the system further comprising a reboiled stripper distillation tower, wherein the product stream comprises hydrogen sulfide.

5. The system of claim 1 wherein the liquid phase is selected from liquid phases comprising sulfur-containing species and hydrocarbons; liquid phases comprising nitrogen-containing species and hydrocarbons; and liquid phases comprising unsaturated hydrocarbons; wherein the dispersion has a mean bubble diameter of less than 400 nm.

6. The system of claim 1 wherein the at least one high shear mixing device is capable of producing a tip speed of the at least one rotor of at least 40.1 m/s (7,900 ft/min).

7. The system of claim 1 comprising at least two high shear mixing devices.

8. A system for a hydrodesulfurization, hydrodenitrogenation, or hydrofinishing catalytic reaction, the system comprising:

a high shear device comprising an inlet for a fluid stream comprising a liquid and hydrogen gas, and an outlet for a product dispersion, wherein the high shear device is configured to produce a dispersion of hydrogen gas bubbles having an average bubble diameter of less than about 5 μm in the liquid; and a reactor selected from hydrodesulfurization, hydrodenitrogenation, and hydrofinishing reactors, wherein the reactor comprises catalyst, wherein the outlet of the high shear device is fluidly connected to an inlet of the reactor, and wherein the reactor is configured for receiving the dispersion from the high shear device and for maintaining a predetermined bulk pressure and temperature for the catalytic hydrodesulfurization, hydrodenitrogenation, or hydrofinishing reaction.

9. The system of claim 8 wherein the high shear device comprises a high shear mill having a tip speed of greater than 5.08 m/s (1000 ft/min).

10. The system of claim 8 wherein the high shear device has a tip speed of greater than 20.3 m/s (4000 ft/min).

11. The system of claim 8, the system further comprising:

a gas separator for receiving a product stream comprising from the reactor; and an absorber configured to receive and clean a gas separator outlet stream, resulting in a cleaned gas stream.

12. The system of claim 11, the system further comprising a reboiled stripper distillation tower, wherein the product stream comprises hydrogen sulfide.

13. In a system for hydrodesulfurization, hydrodenitrogenation, or hydrofinishing catalytic reaction, or a combination thereof, the system comprising:

an external high shear device comprising at least one generator comprising a rotor and a stator having a shear gap therebetween, and an inlet for a fluid stream comprising hydrogen gas and a liquid phase selected from liquid phases comprising sulfur-containing species and hydrocarbons; liquid phases comprising nitrogen-containing species and hydrocarbons; and liquid phases comprising unsaturated hydrocarbons; wherein the high shear device produces a dispersion of the hydrogen gas and the liquid phase; and a fixed bed reactor comprising catalyst, wherein the fixed bed reactor is configured to receive the dispersion from the high shear device and to maintain a predetermined bulk pressure and temperature for the catalytic hydrodesulfurization, hydrodenitrogenation, or hydrofinishing reaction.

14. The system of claim 13 wherein the high shear device comprises at least two generators.

15. The system of claim 14 wherein the shear rate provided by one generator is greater than the shear rate provided by another generator.

16. The system of claim 13, the system further comprising:

a gas separator for receiving a product stream comprising from the fixed bed reactor; and an absorber configured to receive and clean a gas separator outlet stream, resulting in a cleaned gas stream.

17. The system of claim 16, the system further comprising a reboiled stripper distillation tower, wherein the product stream comprises hydrogen sulfide.

* * * * *